Feb. 19, 1957            G. KLEMT            2,781,695
OPTICAL SYSTEM WITH LARGE EFFECTIVE IMAGE ANGLE
Filed July 29, 1955
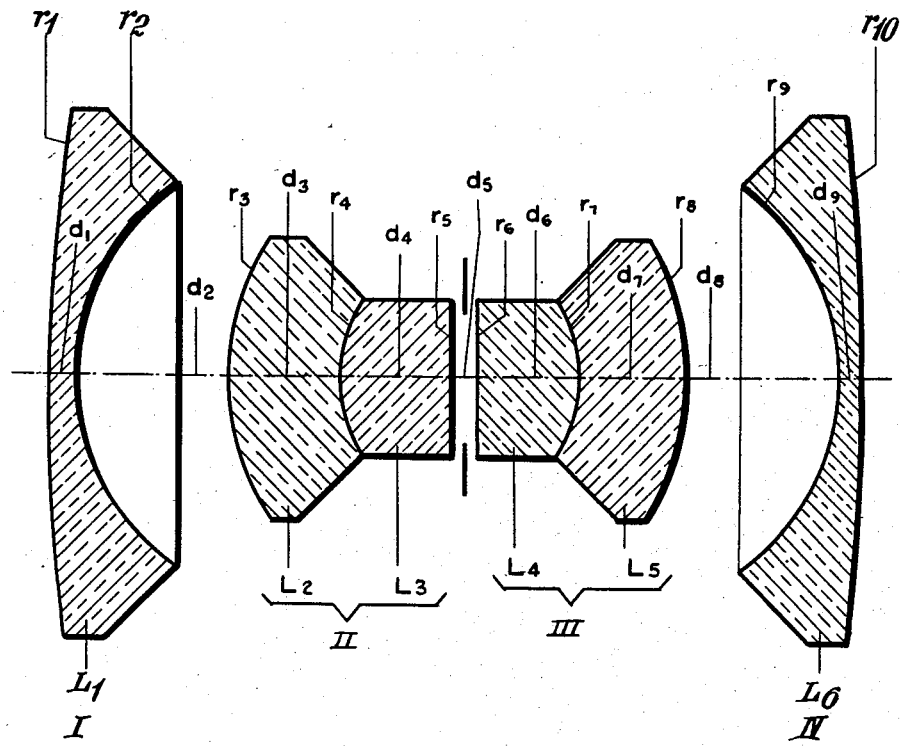
INVENTOR:
*Günter Klemt*
BY
*Karl F. Ross*
AGENT

United States Patent Office 2,781,695
Patented Feb. 19, 1957

2,781,695

OPTICAL SYSTEM WITH LARGE EFFECTIVE IMAGE ANGLE

Gunter Klemt, Kreuznach, Rhineland, Germany, assignor to Jos. Schneider & Co., Kreuznach, Rhineland, Germany Application July 29, 1955, Serial No. 525,175

Claims priority, application Germany August 31, 1954

6 Claims. (Cl. 88—57)

My present invention relates to an optical objective system designed for high-quality image projection upon a relatively wide area, more particularly to a system with four air-spaced members including an inner pair of collective members each cemented from two lenses of opposite refractivity, flanking the diaphragm space, and an outer pair of single lenses shaped as negative menisci and spaced at an appreciable distance from the respective members of the inner pair. A system of this character has been found generally suitable for wide-area projection.

An object of this invention is to provide an improved system of the above type adapted, aside from having a favorable aperture ratio, to produce a particularly well-flattened image over a large angle of projection.

Another object of this invention is to provide an optical system with the advantageous characteristics set forth which additionally is satisfactorily corrected for coma and for spherical, chromatic and astigmatic aberrations.

A feature of my present invention resides in such a dimensioning of the members of the aforedefined objective system that the central thickness of each of the two inner, collective members is at least 25% of the overall physical length of the system, this length in turn amounting to not more than 85% of the system's overall focal length; furthermore, the radii of curvature of the two collective members are such that the negative components thereof are nearly concentrically concavo-convex and face the diaphragm with their concave sides whereas the inner faces of the two positive components, adjoining the diaphragm space, are plane or nearly so.

Another feature of my invention resides in such a shaping of the two outer menisci and of the outer components of the inner, compound members that the two air spaces therebetween assume the form of positive menisci whose central thicknesses add up to a value between 20% and 40% of the overall focal length of the system.

A further feature of my invention resides in such a distribution of the refractive powers of the various lens elements as to give to each of the single menisci an index of refraction less than 1.5 and to the outer, negative component of each compound member an index of refraction greater than 1.7 for the yellow helium line of the spectrum, the difference of the refractive indices across the cemented surface of each compound member being at the same time greater than 0.12.

The above other objects and features of the invention will become apparent from the description of a specific embodiment which has been illustrated diagrammatically in the sole figure of the accompanying drawing.

The drawing figure shows an outer pair of dispersive members I, IV encompassing an inner pair of collective members II, III. Member I comprises a single, meniscus-shaped lens $L_1$ having radii of curvature $r_1$, $r_2$ and thickness $d_1$. Member II comprises a dispersive component $L_2$ with almost concentric surfaces, of radii are $r_3$, $r_4$ and thickness $d_3$, cemented to a substantially plano-convex component $L_3$ having radii $r_4$, $r_5$ and thickness $d_4$; the spacing between members I and II is indicated at $d_2$. Member III, separated by the diaphragm space $d_5$ from member II, is similar to the latter and comprises a substantially plano-convex lens $L_4$, having radii $r_6$, $r_7$ and thickness $d_6$, cemented to a nearly concentric dispersive lens $L_5$ having radii $r_7$, $r_8$ and thickness $d_7$. Member IV, separated from member III by air space $d_8$, is again a single meniscus $L_6$ having radii $r_9$, $r_{10}$ and thickness $d_9$.

The parameters $r_1$ to $r_{10}$ and $d_1$ to $d_9$, the indices of refraction $n_d$ and the Abbé number $\nu_d$ of lenses $L_1$–$L_6$ may have numerical values as given in the following table, for an aperture ratio of 1:8, an overall focal length of numerical value 100 and an image distance of numerical value 73.4:

| Member | Lens | radius | distance | $n_d$ | $\nu_d$ |
|---|---|---|---|---|---|
| I | $L_1$ | $r_1=+183.69$ | $d_1=2.17$ | 1.4645 | 65.7 |
|   |   | $r_2=+23.06$ | $d_2=15.22$ air space |   |   |
| II | $L_2$ | $r_3=+25.57$ | $d_3=11.14$ | 1.7174 | 29.5 |
|   |   | $r_4=+14.02$ |   |   |   |
|   | $L_3$ |   | $d_4=10.97$ | 1.5601 | 47.0 |
|   |   | $r_5=+1,045.94$ | $d_5=2.57$ air (diaphragm) space |   |   |
| III | $L_4$ | $r_6=\infty$ | $d_6=10.18$ | 1.5827 | 46.5 |
|   |   | $r_7=-14.08$ |   |   |   |
|   | $L_5$ |   | $d_7=10.84$ | 1.7174 | 29.5 |
|   |   | $r_8=-26.90$ | $d_8=15.22$ air space |   |   |
| IV | $L_6$ | $r_9=-23.31$ | $d_9=2.17$ | 1.4645 | 65.7 |
|   |   | $r_{10}=-298.93$ |   |   |   |

$d_{total\ length}=80.48$.

It will be noted that, in the specific example given hereinabove, the center thicknesses $(d_3+d_4)$ and $(d_6+d_7)$ of the two collective members II and III have numerical values respectively equal to 22.11 and 21.02, thus more than 25% of the overall physical length $d_{total}$. The latter, having a numerical value of 80.48, is less than 85% of the overall focal length of value 100.

Furthermore, since the outer radius $r_3$ of lens $L_2$ is only slightly larger than the sum of inner radius $r_4$ and lens thickness $d_3$, and since similarly the outer radius $r_8$ of lens $L_5$ is only slightly larger than the sum of inner radius $r_7$ and lens thickness $d_7$, each of these lenses represents a nearly concentric negative element.

It will also be seen that the air spaces between members I, II and between members III, IV are in the shape of positive menisci whose center thicknesses total 30.44, being thus between 20% and 40% of the overall focal length of the system.

Finally, it will be noted that the refractive indices $n_d$ of lenses $L_1$ and $L_6$ are less than 1.5, those of the negative components $L_2$, $L_5$ of compound members II, III are greater than 1.7, and the index difference across the cemented surfaces $r_4$ and $r_7$ is 0.1573 and 0.1347 respectively, being thus greater than 0.12. The angle of projection of this objective is approximately 100°.

The invention is, of course, not limited to the specific example described and illustrated but may be embodied in various modifications thereof without departing from the spirit and scope of the appended claims.

I claim:

1. A wide-angle optical objective system consisting of four air-spaced members including an inner pair of collective members enclosing a diaphragm space and an outer pair of dispersive members encompassing said inner pair, each of said dispersive members being a single meniscus-shaped lens, each of said collective members being composed of a negative and a positive component cemented together, each of said negative components being approximately concentrically concavo-convex and facing said diaphragm space with its concave side, the inner faces of said positive components at the boundaries of said diaphragm space being at least approximately plane, the center thickness of each of said collective members being equal to at least 25% of the overall physical length of the system, said overall physical length being not greater than 85% of the overall focal length of the system.

2. A system according to claim 1, wherein the inner faces of said dispersive members and the outer faces of said collective members define air spaces in the form of positive menisci whose center thicknesses total between 20% and 40% of the overall focal length of the system.

3. A wide-angle optical system consisting of four air-spaced members including an inner pair of collective members enclosing a diaphragm space and an outer pair of dispersive members encompassing said inner pair, each of said dispersive members being a single meniscus-shaped lens, each of said collective members being composed of a negative and a positive component cemented together, each of said negative components being approximately concentrically concavo-convex and facing said diaphragm space with its concave side, said positive components being at least approximately plano-convex and adjoining the diaphragm space with their substantially plane sides, the inner faces of said dispersive members and the outer faces of said collective members defining air spaces in the form of positive menisci, the sum of the center thicknesses of said meniscus-shaped air spaces being between 20% and 40% of the overall focal length of the system, the center thickness of each of said collective members being equal to at least 25% of the overall physical length of the system.

4. A system according to claim 3, wherein said overall physical length is not greater than 85% of the overall focal length of the system.

5. A wide-angle objective system consisting of four air-spaced members including an inner pair of collective members enclosing a diaphragm space and an outer pair of dispersive members encompassing said inner pair, each of said dispersive members being a single meniscus-shaped lens, each of said collective members being composed of a negative and a positive component cemented together, each of said negative components being approximately concentrically concaxo-convex and facing said diaphragm space with its concave side, said positive components being at least approximately plano-convex and adjoining the diaphragm space with their substantially plane sides, the center thickness of each of said collective members being equal to at least 25% of the overall physical length of the system, said overall physical length being not greater than 85% of the overall focal length of the system, the inner faces of said dispersive members and the outer faces of said collective members defining air spaces in the form of positive menisci whose center thicknesses total between 20% and 40% of said overall focal length, each of said single lenses having an index of refraction for the yellow helium line less than 1.5, each of said negative components having an index of refraction greater than 1.7, the difference between the indices of refraction of the two components of each of said collective members being greater than 0.12.

6. A system according to claim 5, wherein for an overall focal length of numerical value 100 the radii $r_1$, $r_2$ and the thickness $d_1$ of the first dispersive member $L_1$, the air space $d_2$ separating said first dispersive member from the first collective member, the radii $r_3$, $r_4$ and the thickness $d_3$ of the negative component $L_2$ of said first collective member, the radii $r_4$, $r_5$ and the thickness $d_4$ of the positive component $L_3$ of said first collective member, the diaphragm space $d_5$ separating said first collective member from the second collective member, the radii $r_6$, $r_7$ and the thickness $d_6$ of the positive component $L_4$ of said second collective member, the radii $r_7$, $r_8$ and the thickness $d_7$ of the negative component $L_5$ of said second collective member, the air space $d_8$ separating said second collective member from the second dispersive member $L_6$, the radii $r_9$, $r_{10}$ and the thickness $d_9$ of said second dispersive members, and the indices of refraction $n_d$ as well as the Abbé numbers $v_d$ said single lenses $L_1$, $L_6$ and of all of said components $L_2$–$L_5$ have numerical values substantially as given in the following table:

| | | | $n_d$ | $v_d$ |
|---|---|---|---|---|
| $L_1$ | $r_1 = +183.69$ | $d_1 = 2.17$ | 1.4645 | 65.7 |
| | $r_2 = +23.06$ | $d_2 = 15.22$ air space | | |
| $L_2$ | $r_3 = +25.57$ | $d_3 = 11.14$ | 1.7174 | 29.5 |
| | $r_4 = +14.02$ | | | |
| $L_3$ | $r_5 = +1,045.94$ | $d_4 = 10.97$ | 1.5601 | 47.0 |
| | | $d_5 = 2.57$ air (diaphragm) space | | |
| $L_4$ | $r_6 = \infty$ | $d_6 = 10.18$ | 1.5827 | 46.5 |
| | $r_7 = -14.08$ | | | |
| $L_5$ | $r_8 = -26.90$ | $d_7 = 10.84$ | 1.7174 | 29.5 |
| | | $d_8 = 15.22$ air space | | |
| $L_6$ | $r_9 = -23.31$ | $d_9 = 2.17$ | 1.4645 | 65.7 |
| | $r_{10} = -298.93$ | | | |

References Cited in the file of this patent

UNITED STATES PATENTS

| 2,516,724 | Roossinov | July 25, 1950 |

FOREIGN PATENTS

| 21,211 | Great Britain | of 1901 |
| 322,506 | Germany | July 1, 1920 |
| 680,185 | Great Britain | Oct. 1, 1952 |
| 1,096,963 | France | Feb. 9, 1955 |